Figure 1:
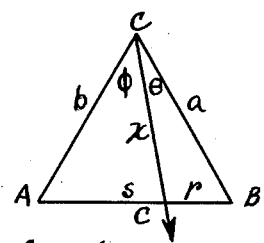

May 27, 1952  J. B. GEHMAN  2,598,250
COMPUTING DEVICE
Filed Dec. 28, 1950

INVENTOR
John B. Gehman
BY
ATTORNEY

Patented May 27, 1952

2,598,250

UNITED STATES PATENT OFFICE 2,598,250

COMPUTING DEVICE

John B. Gehman, Haddonfield, N. J., assignor to Radio Corporation of America, a corporation of Delaware Application December 28, 1950, Serial No. 203,060

6 Claims. (Cl. 235—61)

This invention relates to computers and more particularly to an electro-mechanical computer for obtaining the value of an angle in either of two adjacent triangles when information as to other functions of the triangle is provided.

In some of the present day navigation systems such as "Shoran," two fixed points which are separated from each other by a known distance are used to transmit position information to a moving vehicle. The two fixed points and the vehicle position form the defining points of a triangle in which the base is the line between the two fixed points. If the vehicle is moving toward the base line and it is desired to cross the base line at a certain point, the line from the vehicle to that point forms two adjacent triangles. For the purposes of accurate navigation it may be desirous to know the values of the adjacent angles in these two adjacent triangles. Similarly, if the vehicle has crossed the base line and is proceeding away therefrom the same information is required. Because of the speed at which present day vehicles move a rapid solution is essential.

Besides being useful in the field of navigation, a computer, which quickly solves problems which pertain to triangle functions, also finds utility in the general field of computing and in range determining devices.

It is therefore an object of the present invention to provide a novel electro-mechanical computer for the rapid solution of problems pertaining to triangular functions.

It is a further object of the present invention to provide a simple and relatively inexpensive electro-mechanical computer for the rapid solution of problems pertaining to triangular functions.

Still another object of the present invention is to provide an improved electro-mechanical computer which determines the adjacent angles of two adjacent triangles from information as to the base angles and the ratio of the lengths of the base opposite the two adjacent angles.

These and further objects of the invention are attained by providing four angle resolvers wherein a first and fourth of these have their stators stationary. The rotor of the first angle resolver is mechanically coupled to the stator of a second angle resolver so that both are rotatable together. The rotor of the fourth angle resolver is mechanically coupled to the stator of a third angle resolver so that both are rotatable together. The rotors of the second and third angle resolvers are connected to be rotatable together. The first angle resolver rotor winding output is applied to the third angle resolver stator. The fourth angle resolver output is applied to the second angle resolver stator. The second angle resolver rotor output is applied to a multiplying device which multiplies it by the ratio of the lengths of the base opposite each of the adjacent angles. The outputs from the multiplying device to the third angle resolver rotor output are opposingly combined and applied to a servo-amplifier whose output controls a servo-motor. The servo-motor shaft is connected to drive the connection joining the second and third angle resolver rotors. If the counter-clockwise angle between the first angle resolver rotor and stator represents one base angle in a triangle which has been split into two adjacent triangles by a line between the vertex and the base, and if the clockwise angle between the fourth angle resolver rotor and stator is permitted to represent the other base angle, and if the voltage multiplier is set to the ratio of the base lengths opposite the adjacent angles, then the servo-motor will drive the second and third angle resolver rotors until the signal applied to the servo-amplifier is a null. At that time the counter-clockwise angle between the second angle resolver stator and rotor represents the adjacent angle in the adjacent triangle containing the base angle entered into the first angle resolver. The clockwise angle between the third angle resolver stator and rotor represents the other adjacent angle. If a base angle in one adjacent triangle, an adjacent angle in the other triangle and the base ratio are known, the servo-motor can be coupled to either the first or fourth angle resolver rotor depending on the unknown base angle, and a solution for the angle will be provided. Likewise, if the base angles and adjacent angles be known, the servo-motor may be used to drive the multiplier to obtain the correct base line ratio.

Figure 2:
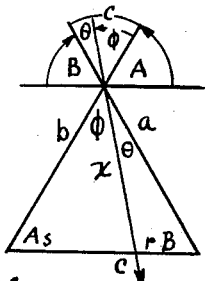
Figure 3:
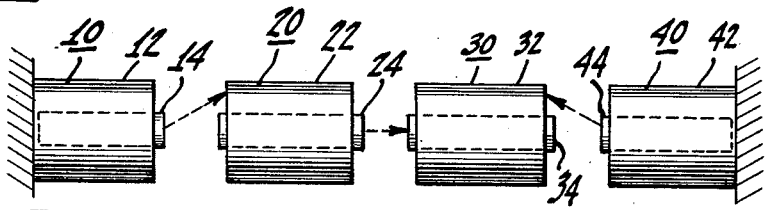
Figure 4:
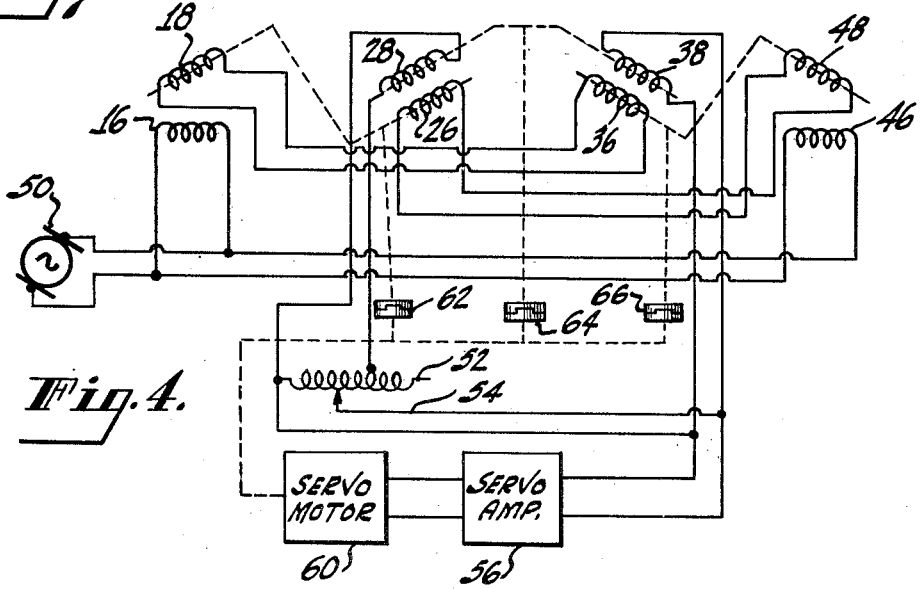

The novel features of the invention, as well as the invention itself, both as to its method of operation and organization, will best be understood from the following description, when read in connection with the accompanying drawings, in which Figure 1 is a drawing of adjacent triangles shown for the purpose of illustrating the problem to be solved, Figure 2 is a drawing of a pair of adjacent triangles with a geometric construction which is shown to illustrate the principles of operation of the subject invention, Figure 3 is a schematic representation of the mechanical connections of the four angle resolvers used in an embodiment of the invention, and Figure 4 is a circuit diagram of an embodiment of the invention.

Referring now to Figure 1, there may be seen a triangle having two base angles A and B and a vertex angle C. The sides opposite the angles are designated as $a$, $b$ and $c$. A line has been drawn from the vertex through the base line, thus forming adjacent triangles having adjacent angles $\phi$ and $\theta$ with base lengths opposite the angles which are respectively designated as S and $r$. The length of this line from vertex to base is $x$.

From the law of sines $$\frac{x}{s} = \frac{\sin A}{\sin \phi}, \frac{x}{r} = \frac{\sin B}{\sin \theta}$$

$$x = r \frac{\sin B}{\sin \theta} = s \frac{\sin A}{\sin \phi}$$

$$\left(\frac{r}{s}\right) \sin B \sin \phi = \sin A \sin \theta$$

$$\left(\frac{r}{s}\right) \sin B \sin \phi - \sin A \sin \phi = 0 \quad (1)$$

or, $$\sin B \sin \phi - \frac{s}{r} \sin A \sin \theta = 0 \quad (2)$$

Referring now to Figure 3, an arrangement of four angle resolvers 10, 20, 30, 40 used in an embodiment of the invention may be seen. Each angle resolver is of the type well known in the art, which has a stator with a stator winding and a rotor with a rotor winding. The rotor winding is arranged to be rotatable within the field of the stator winding in a sine voltage inducing relationship with the stator winding. A first 10 and fourth 40 of the angle resolvers have their stators 12, 42 held blocked or stationary. The rotor 14 of the first angle resolver 10 is mechanically connected to the stator 22 of the second angle resolver 20 to be rotatable together. The rotor 44 of the fourth angle resolver 40 is mechanically connected to the stator 32 of the third angle resolver 30 to be rotatable together. The rotors 24, 34 of the second and third angle resolvers 20, 30 are mechanically connected to be rotatable together. The stators 22, 32 of the second and third angle resolvers 20, 30 may be supported by wheels or bearings or in any other known manner for the purpose of supporting an object and yet permitting it to be rotated.

Figure 2 shows the same triangle A, B, C as is shown in Figure 1 with the sides $a$ and $b$ as well as the line which divides the triangle into adjacent triangles all extended through the apex. A line parallel to the base is also drawn through the apex. From elementary geometry it will be readily recognized that the clockwise angle between the parallel line and the extension of side $a$ is equal to angle B, the counterclockwise angle between the parallel line and the extension of side $b$ is equal to angle A. The remaining angle between the extended sides is angle C. Angle C includes the angles $\theta$ and $\phi$.

Referring again to the four angle resolver alignment shown in Figure 3, initially all four angle resolvers are aligned so that the angles made between their rotors and stator is zero. Now if the rotor 14 of the first angle resolver 10 is rotated counterclockwise an amount proportional to angle A, and if the rotor 44 of the fourth angle resolver 40 is rotated clockwise an amount proportional to angle B, the angle between the second and third angle resolver stators 22, 32 which are respectively moved together with the first and fourth angle resolver rotors by virtue of their mechanical coupling therewith, is proportional to angle C. The motion of these respective rotors and stators is the same as is shown by the arrow delineating angles A and B in Figure 2. By a proper positioning of the ganged rotors 24, 34 of the second and third angle resolvers, the angle $\phi$ will exist as a counterclockwise angle between the second angle resolver rotor 24 and stator 22 and the angle $\theta$ will exist as a clockwise angle between the third angle resolver rotor 34 and stator 32.

Figure 4 shows a complete circuit diagram of the computer which is an embodiment of my present invention. A voltage source 50 is connected to excite the stator windings 16, 46 of the first and fourth angle resolvers 10, 40 with a voltage $E_0$. The first angle resolver rotor winding 18, which is positioned at an angle A, has induced therein a voltage $E_0 \sin A$. This rotor winding 18 is connected to the third angle resolver stator winding 36 to impress the voltage $E_0 \sin A$ thereon. The fourth angle resolver rotor winding 48 is positioned at an angle B and a voltage $E_0 \sin B$ is induced therein. This rotor winding 48 is connected to the second angle resolver stator winding 26 to impress the voltage $E_0 \sin B$ thereon.

The second angle resolver rotor winding 28 is connected to apply the voltage induced therein to an auto-transformer 52. The auto transformer has an adjustable output tap 54 so that the ratio of the input to the output voltage may be selected as desired by moving the tap 54. The auto-transformer tap 54 is set so that the ratio of the input to the output voltage is $r/s$. Effectively this device multiplies the input voltage by the ratio of the lengths of the adjacent triangle bases. The output of the auto-transformer 52 and third angle resolver rotor 38 are opposingly combined and the resultant is applied to a servo amplifier 56. The servo-amplifier output controls a servo-motor 60. The motor is connected to rotate the common mechanical connection for the second and third angle resolver rotors and does so until the input to the servo amplifier 56 is a null.

If the second angle resolver rotor winding 28 is properly positioned with reference to its stator winding 26 then the angle existing therebetween is equal to $\phi$, the output of the rotor winding 28 is $E_0 \sin B \sin \phi$ and the output of the auto-transformer 52 is $$\frac{r}{s} E_0 \sin B \sin \phi$$

Similarly the output of the third angle resolver rotor winding 38 is $E_0 \sin A \sin \theta$. Referring to Equation 1, it may be seen that when these two voltages are opposed their resultant should be zero. Therefore, if angles A and B and the ratio $r/s$ are properly set into the computer, the servo amplifier 56 and the motor 60 will function to turn the second and third angle resolver rotors until the input to the servo amplifier is a null at which time Equation 1 is satisfied and the counterclockwise angle between the second angle resolver rotor 24 and the stator 26 is equal to $\phi$, and the clockwise angle between the third angle resolver stator 32 and the rotor 34 is equal to $\theta$. Usually an angle resolver rotor is provided with more than one winding. An electrical indication of the angles may be obtained from these supplementary windings.

In place of the auto-transformer 52 a potentiometer or other voltage dividing device may be used to establish the ratio $r/s$. However, when a ratio greater than one occurs, angle A may be set into the fourth angle resolver and angle B into the first angle resolver instead of vice versa as previously explained herein. The subject embodiment of the invention then acts to solve Equation 2 wherein the ratio $s/r$ is used instead of $r/s$.

If only one base angle, and the adjacent angle opposite that base angle as well as the ratio of the base lengths is given, by coupling the servomotor to drive the rotor of the angle resolver representing the unknown base angle, instead of the second and third angle resolver rotors, a solution for that base angle is obtained, for example, if angles A and $\phi$ and the ratio are given, then coupling the servomotor to drive the fourth angle resolver rotor enables the computer to solve for angle B. A solution for angle A may be similarly obtained if angles B and $\theta$ and the ratio are given. If the ratio is desired and angles A, B and $\theta$ or $\phi$ are given by coupling the servomotor to the ratio determining tap of the multiplying device, when the servo amplifier input is at a null, the ratio is correctly determined by the tap setting. If it is desired, the servomotor may be coupled through clutches 62, 64, 66 to each of the angle resolver ganged couplings. In this manner a solution for either one of the base angles or the adjacent angles is obtainable by disconnecting or decoupling the clutches which drive the known value representative angle resolver rotors and allowing only the clutch driving the unknown value representative angle resolver rotor to be engaged. In this manner a versatile triangle function computer is provided. The clutches may be made of the magnetic type and thus may be made to operate quickly.

From the foregoing description, it will be readily apparent that I have provided an improved novel and simple electromechanical computing apparatus for solving for unknown triangle functions. Although I have shown and described but a single embodiment of my present invention, it should be apparent that many changes may be made in the particular embodiment herein disclosed, and that many other embodiments are possible, all within the spirit and scope of my invention. Therefore, I desire that the foregoing description shall be taken as illustrative and not as limiting.

What is claimed is:

1. A computer for generating a function of two adjacent triangles formed from one triangle with a line drawn from the vertex to the base of the one triangle comprising first, second, third and fourth angle resolvers each having a stator with a stator winding and a rotor with a rotor winding rotatable in a sine voltage inducing relationship with said stator winding, means coupling said first angle resolver rotor and said second angle resolver stator to be jointly movable, means coupling said fourth angle resolver rotor and said third angle resolver stator to be jointly movable, means coupling said second and third angle resolver rotors to be jointly movable, the counterclockwise angle between said first angle resolver rotor and stator being representative of one base angle in said one triangle, the clockwise angle between said fourth angle resolver rotor and stator being representative of the other base angle in said one triangle, the counterclockwise angle between said second angle resolver rotor and stator being representative of one of the adjacent angles and the clockwise angle between said third angle resolver rotor and stator being representative of the other adjacent angle, means connecting said first angle resolver rotor winding to said third angle resolver stator winding, means connecting said fourth angle resolver rotor winding with said second angle resolver stator winding, means connected to said second angle resolver rotor winding to multiply its output by the ratio of the two sides opposite the adjacent angles in said adjacent triangles, means to combine said multiplying means output with the output from the rotor winding of said third angle resolver to provide a resultant error signal and means responsive to said error signal to move the one of said coupling means which determines the position of one of said angle resolver rotors with reference to its stator to provide an angle proportional to an angle in one of said adjacent triangles whose value is sought when the values of other angles in said adjacent triangle is provided.

2. A computer for determining the adjacent angles formed at the vertex of a triangle by a line drawn from said vertex to the base of said triangle from information as to the values of the two base angles of said triangle and the ratio of the lengths of the two base portions formed by the intersection of said line with said base comprising first, second, third, and fourth angle resolvers each having a stator with a stator winding and a rotor with a rotor winding rotatable in a sine voltage inducing relationship with said stator winding, means to rotate together counterclockwise said first angle resolver rotor and said second angle resolver stator by an angle proportional to one of said base angles, means to rotate together clockwise said fourth angle resolver rotor and said third angle resolver stator by an angle proportional to the other of said base angles, means including said first and third angle resolvers to generate a first voltage proportional to the product of said applied voltage, the sine of said one of said base angles and the sine of the one of said adjacent angles which is opposite said other base angle, means including said second and fourth angle resolvers to generate a second voltage proportional to the product of said applied voltage, the sine of said other base angle and the sine of said other adjacent angle, means to multiply said second generated voltage by the ratio of said two base portion lengths to provide a third voltage, means to combine said first generated voltage and said third voltage to provide a resultant error voltage, and means responsive to said error voltage to rotate said second and third angle resolver rotors until said error voltage is zero, whereby the angles between said second angle resolver rotor and stator and said third angle resolver rotor and stator are respectively equal to the two adjacent angles of said triangle.

3. A computer for determining the adjacent angles formed at the vertex of a triangle by a line drawn from said vertex to the base of said triangle from information as to the values of the two base angles of said triangle and the ratio of the lengths of the two base portions formed by the intersection of said line with said base comprising first, second, third and fourth angle resolvers each having a stator with a stator winding and a rotor with a rotor winding rotatable in a sine voltage-inducing relationship with said stator winding, means to rotate together counterclockwise said first angle resolver rotor and said second angle resolver stator by an angle proportional to one of said base angles, means to rotate together clockwise said fourth angle resolver rotor and said third angle resolver stator by an angle proportional to the other of said base angles, means to apply a voltage to said first and third angle resolver stators, means to connect said first angle resolver rotor to said third angle resolver stator, means coupled to the output of said second angle resolver rotor to multiply said output by the ratio of said base portion lengths, means to combine the output of said last-named means with the output of said third angle resolver rotor to provide an error signal, and means responsive to said error signal to rotate said second and third angle resolvers together until said error signal is substantially eliminated whereby the angles between said second angle resolver rotor and stator and said third angle resolver rotor and stator are respectively equal to the two adjacent angles of said triangle.

4. A computer for determining a base angle in a triangle, wherein a line is drawn from the vertex to the base forming two adjacent angles, from information as to the values of the other base angle, one of the vertex angles and the ratio of the lengths of the base opposite the adjacent angles comprising first, second, third, and fourth angle resolvers each having a stator with a stator winding and a rotor with a rotor winding rotatable in a sine voltage inducing relationship with said stator winding, said first angle resolver rotor winding being connected to said third angle resolver stator winding, said fourth angle resolver rotor winding being connected to said second angle resolver stator winding, means coupling said first angle resolver rotor and said second angle resolver stator to be simultaneously rotatable, means coupling said fourth angle resolver rotor with said third angle resolver stator to be simultaneously rotatable, means coupling said second and third angle resolver rotors to be simultaneously rotatable, means to multiply the output of said second angle resolver rotor winding by said base lengths ratio connected to said rotor winding, and servo motor means to which the output of said multiplying means and said third angle resolver rotor winding are opposingly connected, said servo motor being coupled to drive said first angle resolver rotor and second angle resolver stator coupling means whereby, when said fourth angle resolver rotor is positioned clockwise at an angle to its stator equal to said known base angle and said third angle resolver rotor is positioned clockwise at an angle to its stator equal to the vertex angle opposite said known base angle, said first angle resolver rotor is positioned by said servo motor at a counterclockwise angle to its stator equal to said desired base angle of said triangle.

5. A computer for determining the ratio of the two lengths of the bases of two adjacent triangles formed by drawing a line from the vertex of a triangle to the base, from information as to the two base angles and one of the adjacent angles of said triangle comprising first, second, third, and fourth angle resolvers each having a stator with a stator winding and a rotor with a rotor winding rotatable in a sine voltage inducing relationship with said stator winding, means to rotate together counterclockwise said first angle resolver rotor and said second angle resolver stator by an angle proportional to one of said base angles, means to rotate together clockwise said fourth angle resolver rotor and said third angle resolver stator by an angle proportional to the other of said base angles, means to apply a voltage to said first and third angle resolver stators, means including said first and third angle resolvers to generate a first voltage proportional to the product of said applied voltage, the sine of said one of said base angles and the sine of the one of said adjacent angles which is opposite said other base angle, means including said second and fourth angle resolvers to generate a second voltage proportional to the product of said applied voltage, the sine of said other base angle and the sine of said other adjacent angle, an auto-transformer having a variable output ratio control, means to apply said second voltage to said auto-transformer input, and servo-motor means to which said auto-transformer output and said first voltage are opposingly applied, said servo-motor means being coupled to drive said variable output ratio control to determine the ratio of the output to the input to said auto-transformer, whereby when said first angle resolver rotor is positioned counterclockwise to its stator at an angle representative of one of said base angles and said fourth angle resolver rotor is positioned clockwise to its stator at an angle representative of the other of said base angles and either of the rotors of the second and third angle resolvers are positioned so that the angle between the respective second and third angle resolver rotors and stators considered respectively counterclockwise and clockwise are respectively representative of the adjacent angles opposite the respective base angles, said servo-motor means positions said variable output ratio control at a position whereby the output of said auto-transformer is the product of the input and ratio of said two lengths of said bases.

6. A computer for determining the two adjacent angles formed at the vertex of a triangle by a line drawn from said vertex to the base of said triangle from information as to the values of the two base angles of said triangle and the ratio of the lengths of the two base portions opposite said vertex angles comprising first, second, third, and fourth angle resolvers each having a stator with a stator winding and a rotor with a rotor winding rotatable in a sine voltage inducing relationship with said stator winding means to fixedly position said first and fourth angle resolver stators, means to mechanically couple said second angle resolver stator with said first angle resolver rotor to be rotatable therewith, means to mechanically couple said third angle resolver stator with said fourth angle resolver rotor to be rotatable therewith, means mechanically coupling said second and third angle resolver rotors to be rotatable together, means to apply a voltage to the stator windings of said first and fourth angle resolvers, means to rotate said first angle resolver rotor counterclockwise by an amount proportional to one of said triangle base angles, means to rotate said fourth angle resolver rotor clockwise by an amount proportional to the other of said triangle base angles, means to connect said first angle resolver rotor winding to said third angle resolver stator winding, means to connect said fourth angle resolver rotor winding to said second angle resolver stator winding, auto-transformer means to which said second angle resolver rotor winding output is applied to multiply said output by said base lengths ratio, means to combine the output of said auto-transformer and the output of said third angle resolver rotor to form a resultant, and means upon which said resultant is applied to rotate said second and third angle resolver rotors until said resultant is zero whereby the angle between said second angle resolver rotor and stator equals one of said adjacent angles and the angle between said third angle resolver rotor and stator equals the other of said adjacent angles.

JOHN B. GEHMAN.

No references cited.